United States Patent
Sumasu et al.

(10) Patent No.: US 6,718,181 B1
(45) Date of Patent: Apr. 6, 2004

(54) COMMUNICATION TERMINAL, AND OVER-INTERFERENCE PREVENTION METHOD

(75) Inventors: Atsushi Sumasu, Yokosuka (JP); Osamu Kato, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 446 days.

(21) Appl. No.: 09/744,911
(22) PCT Filed: Jun. 1, 2000
(86) PCT No.: PCT/JP00/03523
§ 371 (c)(1), (2), (4) Date: Jan. 31, 2001
(87) PCT Pub. No.: WO00/76246
PCT Pub. Date: Dec. 14, 2000

(30) Foreign Application Priority Data

Jun. 3, 1999 (JP) .......................... 11-156630
Jul. 6, 1999 (JP) .......................... 11-191602

(51) Int. Cl.[7] ................................. H04B 7/00
(52) U.S. Cl. ........................... 455/522; 455/453
(58) Field of Search ................. 455/69, 522, 436, 455/442, 452.1, 452.2, 453, 464, 509, 450; 370/318, 332, 232, 543

(56) References Cited

U.S. PATENT DOCUMENTS 5,590,177 A  12/1996 Vilmur et al.

FOREIGN PATENT DOCUMENTS

| EP | 0682419 | 11/1995 |
|---|---|---|
| EP | 0697799 | 2/1996 |
| EP | 0918402 | 5/1999 |
| JP | 02274131 | 11/1990 |
| JP | 8-32514 | 2/1996 |
| JP | 8-65265 | 3/1996 |
| JP | 10056420 | 2/1998 |
| KR | 1998 077725 | 11/1998 |
| KR | 2001 0019655 | 3/2001 |

OTHER PUBLICATIONS

Korean Office Action dated Feb. 21, 2003 with English translation.

Korean Office Action dated Apr. 18, 2003 with English translation.

*Primary Examiner*—Nay Maung
*Assistant Examiner*—Tu Nguyen
(74) *Attorney, Agent, or Firm*—Stevens, Davis, Miller & Mosher, LLP (57) ABSTRACT

The presence of a need for a handover operation is checked in the case of the rapid increase in the power values of received signals at a mobile communication terminal. Thereafter, if required, transmission rates of control data necessary for a handover operation, and of signals required for link maintenance are controlled not to be reduced, and a transmission rate of information data is controlled to rapidly be reduced. And if not needed, the transmission power is controlled to be reduced without changing the transmission rate.

17 Claims, 6 Drawing Sheets

COMMUNICATION TERMINAL, AND OVER-INTERFERENCE PREVENTION METHOD

TECHNICAL FIELD

The present invention relates to a communication terminal such as a mobile station in the CDMA (Code Division Multiple Access) radio communication system, which performs multiple access, using the spread spectrum for digital radio communication; and a method for transmission power control for the same.

BACKGROUND ART

The CDMA method is one of techniques for multiple access when a plurality of stations simultaneously communicate each other in the same frequency band for mobile communication like car and cellular telephones. Though the FDMA (Frequency Division Multiple Access) method, the TDMA (Time Division Multiple Access) method and so on have been well-known as other techniques, the CDMA method may realize more efficient use of frequencies, and accommodate more users, comparing with those of the above techniques.

In the CDMA method, a signal of a certain user is an interference one for other users, and, similarly, signals of other users become interference signals for the above user, as a plurality of users share the same frequency band. Therefore, the signal-to-interference ratio (SIR) is required to be constant, independent of the location of a mobile station to obtain uniform communication quality in a service area. Each mobile station is required to control the transmission power, especially, in the case of an uplink from a mobile station to a base station, so that the power of signals sent from each mobile station, when the signals are received at a base station, may be constant in order to reduce interference with signals of an adjacent stations using the same frequency, and so on.

In the case of bidirectional communication using the CDMA method, the FDD (Frequency Division Duplex) method with different transmission carrier frequencies, respectively, for an uplink and a downlink has been generally used. For the CDMA/FDD, transmission power control (TPC) has been generally performed in a closed-loop manner, where received power is measured at a base station, and, based on the received power, instructions to increase or reduce the transmission power are given to a mobile station.

Moreover, when there is caused a rapid increase in the received power, which can not be followed in the closed-loop manner, at the mobile station, TPC has been performed in an open-loop manner, as disclosed in Japanese published unexamined application Hei 8-32514, where the mobile station performs self control of the transmission power so that the sum of the transmission and the received powers may be constant in order not to increase interference with signals of other mobile stations. In the above case, when the transmission power is reduced, there is a possibility to cut out the own link, though there is no increase in the interference with signals of other mobile stations.

Figure 1:
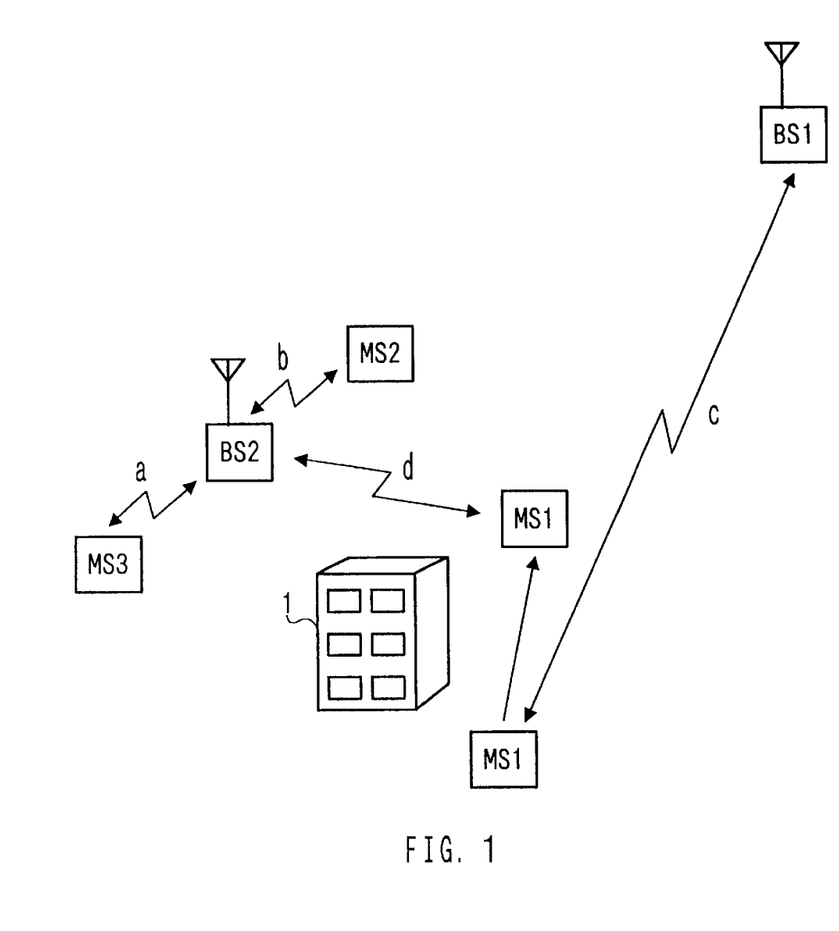
FIG. 1 shows a conceptual diagram of a radio communication system with a communication terminal.

The case where the link is cut out as described above will be described, referring to FIG. 1. In FIG. 1, it is assumed that, though the mobile station MS1 is in a service area of a base station BS2, and in a shorter distance from the station BS2, a mobile station MS1 performs communication (path c) with a base station BS1, as the station BS2 can not be seen from the station MS1 because of a building 1 between them. In the above configuration, the station MS1 transmits large transmission power for communication with the station BS1.

Moreover, the base station BS2 communicates with mobile stations MS2, MS3 in the service area (cell) through paths b, a, respectively.

When the mobile station MS1 moves in the direction of the arrow, the station BS2 comes into the sight of the station MS1. At this point, the station MS1 performs self reduction in the transmission power so as to prevent interference with signals of other mobile stations MS2, MS3 at the station BS2. When the station MS1 reduces the transmission power, the link for the station MS1 is cut out, as there is not enough power necessary for communication between the stations MS1, BS1.

When the link is cut out as illustrated above, users may not place full confidence in the communication services, as they themselves are required to perform reconnection procedures, and much complex operations for the above procedures.

DISCLOSURE OF INVENTION

The object of the present invention is to offer a communication terminal, which performs radio communication without cutting-out of a link and with no increased interference with other stations even in a service area under unfavorable visibility, and a method for transmission power control for the above terminal.

The subject matter of the present invention is to reduce interference effects on other terminals: only control data necessary for a handover operation and signals required for link maintenance are transmitted at the same transmission rate as that one before a rapid increase in a received power at a terminal side, and transmission of information other than the above data and signals is performed at a rapidly reduced rate, when there is the above rapid increase; and, reducing the above transmission rate causes reduction in the power required for transmission, and, accordingly, the above effects may be reduced. Thereafter, procedures for a handover operation are performed with the control data, if required. When there is no need to perform the handover operation, the transmission signal power is reduced without reduction in the transmission rate.

BEST MODE FOR CARRYING OUT THE INVENTION

Hereinafter, embodiments according to the present invention will be described in detail, referring to drawings.

Embodiment 1

Figure 2:
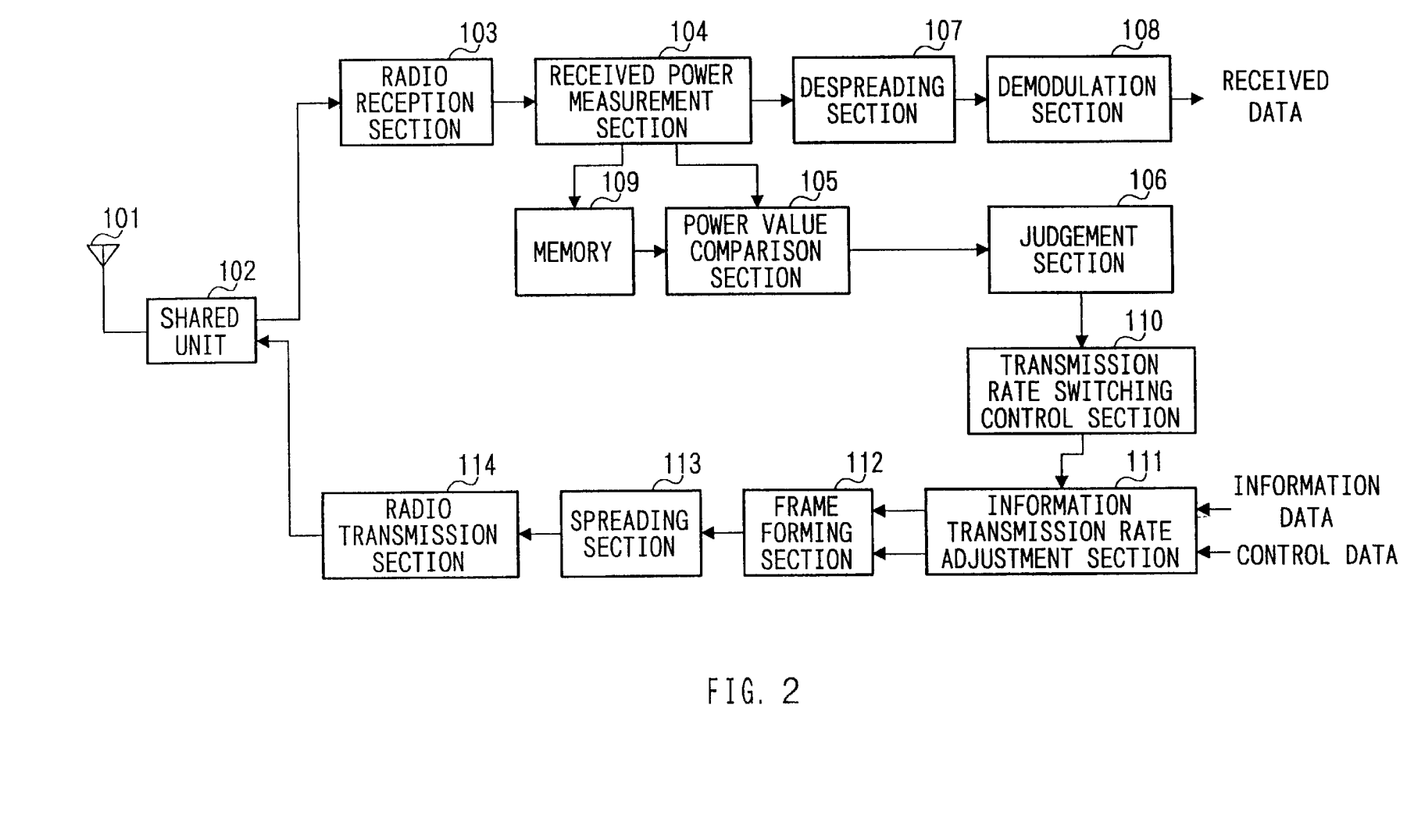
FIG. 2 shows a block diagram of a configuration of a communication terminal according to an embodiment 1 of the present invention.

FIG. 2 shows a block diagram of a configuration of a communication terminal (mobile station) according to an embodiment 1 of the present invention. Now, a communication terminal in a digital radio communication system using the CDMA method will be described.

The signals transmitted by the communication other station are received at a radio reception section 103 through a shared unit 102 after passing through an antenna 101. In the radio reception section 103, individual operations, amplification (gain control), down conversion, and A/D (analog to digital) conversion of the received signals are performed. The signals after the above conversion are sent to a received power measurement section 104 for measurement of the received power. The measured values of the received power are sent to a power value comparison section 105, and stored in a memory 109.

In the power value comparison section 105, the values of the received power sent from the received power measurement section 104, and the values of the received power, which are stored in the memory 109, before one control cycle of the transmission power are compared. The above comparison results of the values of the received power are sent to a judgment section 106 for threshold judgement. Moreover, the received signals after power measurement are sent to a despreading section 107.

In the despreading section 107, a despreading operation of the received signals after spreading modulation at the transmission side is performed, using the same spreading code as the one used at the transmission side. The signals after despreading are sent to a demodulation section 108, and those after demodulation are obtained as received data.

In a transmission rate switching control section 110, switching of transmission rates is controlled, based on the judgment results in the judgment section 106. In an information transmission rate adjustment section 111, the information transmission rate is adjusted, according to the control of the transmission rate switching control section 110.

The data adjusted in the information transmission rate adjustment section 111 are sent to a frame forming section 112, in which frame forming of transmission signals is performed, using information data and control data.

The signals after frame forming are sent to a spreading section 113 for spreading modulation using a predetermined spreading code, and to a radio transmission section 114, which performs D/A conversion, up conversion, and amplification (gain control) of the signals after spreading modulation. The signals after the above operations are transmitted as transmission signals through the antenna 101, after passing through the shared unit 102.

The operations of the communication terminal with the above configuration will be described.

The received signals from the communication other station (base station working as a connection end) are measured for the total sum of the power values of the received signals at the received power measurement section 104. Here, the above total sum denotes the sum of the power value of the desired signal, the power values of signals transmitted to other communication terminals, and the power values of signals from base stations different from the communication other station.

The measured received power is properly stored in the memory 109. The received signals after the power measurement are sent to the despreading section 107 for despreading operation. Thereafter, the received data are obtained after demodulation operation at the demodulation circuit 108.

On the other hand, the values of the received power at reception (values of the received power at the current period) and those of the received power before one control cycle of the transmission power (values of the received power at the preceding period) are compared in the power value comparison section 105. The above values of the received power before one control cycle of the transmission power are output from the memory 109. And the received signals after power measurement are sent to the despreading section 107.

Thereafter, the threshold judgement of the differences in the compared values of the received power is performed at the judgment section 106. The above threshold judgment is performed for checking whether there is a large change in the values of the received power between the preceding and the current period. Then, when the above differences in the values of the received power are larger than a predetermined threshold, it is judged that there is a large change (rapid increase in the power) in the values of the received power between the preceding and the current period, and, when the above differences are smaller than the predetermined threshold, it is judged that there is no large change in the values of the received power between the preceding and the current period. Here, the above threshold is properly set in the system, considering the degree of the interference, and so on. The above results obtained at the judgement section 106 are sent to the transmission rate switching control section 110, in which, in the case of a judgement result that there is no large change in the values of the received power between the preceding and the current period, switching control of the transmission rate is not performed.

On the other hand, the transmission rate switching control section 110 outputs an instruction control signal for substantial reduction in the transmission rate of information data to the information rate adjustment section 111, in the case of a judgement result that there is a large change in the values of the received power between the preceding and the current period.

In the information transmission rate adjustment section 111, a buffering or discarding operation of the information data is performed, according to the above instruction signal. Now, the information data denotes data which a user using the communication terminal desires to send. Moreover, the control data is data required for a handover operation, and independent of signals, which are required for link maintenance, such as a pilot signal, and a TPC signal. The above signals required for link maintenance are added in the frame forming section 112.

Specifically, in the information transmission rate adjustment section 111, the buffering operation of the information data is performed in the case of, for example, the packet communication, where delaying is permitted, and the discarding operation of the information data is done in the case of, for example, the voice communication where delaying is not permitted and instantaneous response is required.

Even in the case of communication requiring instantaneous response, the information transmission rate may be reduced, or the information data may be discarded, as required, when information transmission with a reduced transmission rate, for example, by a half rate is possible. As described above, the transmission rate of the information data may be substantially reduced, and, as a result, the transmission power may be reduced. Thereby, interference with the signals of other stations may be reduced.

Figure 3:
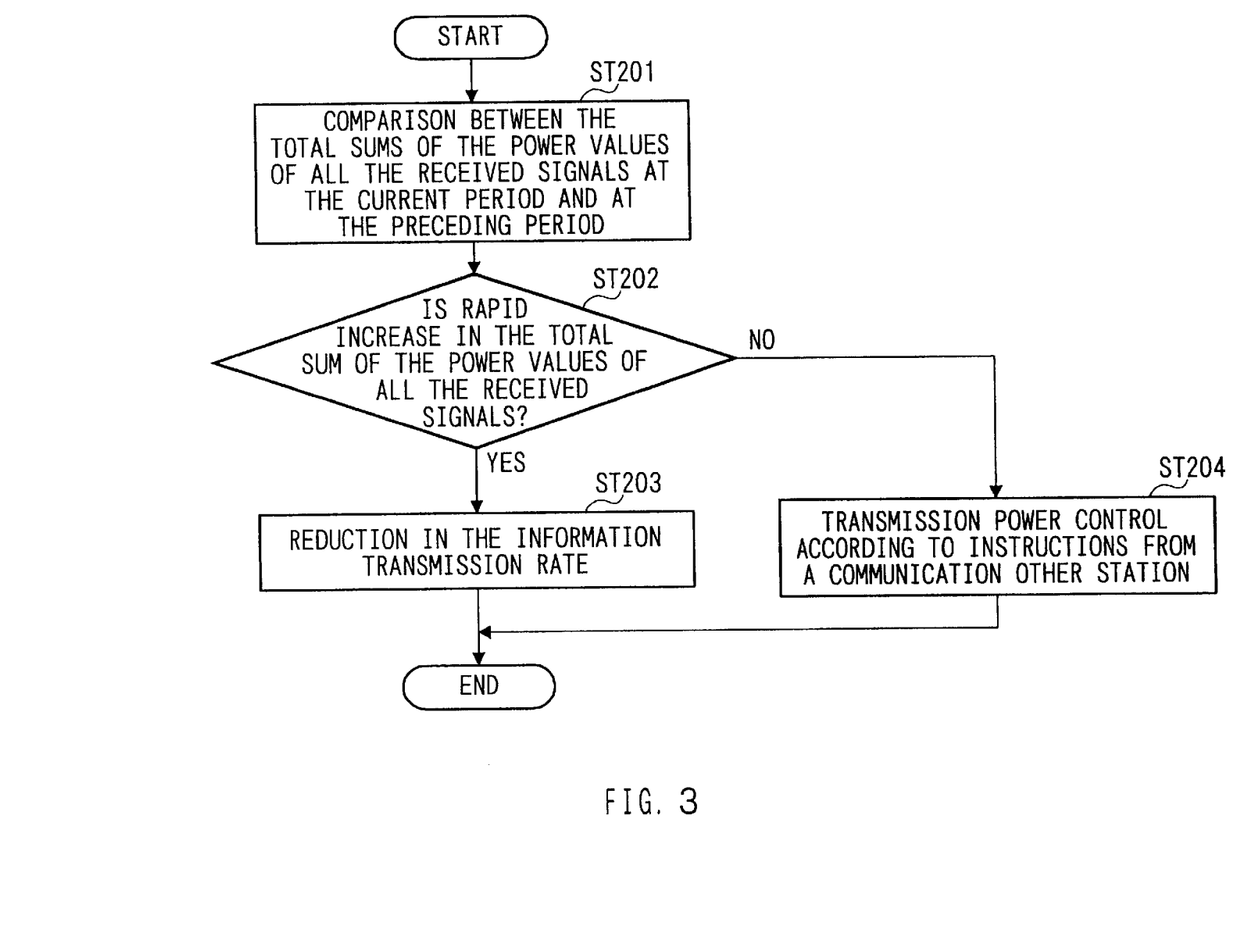
FIG. 3 shows an explanatory flowchart of operations for a transmission power control method according to an embodiment 1 of the present invention.

Now, operations for over-interference prevention control of the communication terminal according to the embodiment 1 of the present invention will be described, referring to a flowchart in FIG. 3.

In the first place, the power of all the received signals is measured in the communication terminal, and the measured total sum of the power values of all the received signals and that sum before one or more control cycles of the transmission power are compared, at step (hereafter, called as ST) 201. Then, the comparison results of the above total sums are judged at ST 202. That is, it is judged whether the increased quantity of the above total sum is larger than a predetermined threshold.

TPC is continued according to TPC instruction from the connection end (communication other station) (ST 204), when there is no large change in the total sum of the power values of all the received signals between the current period and the preceding period before one or more control cycles. On the other hand, control to reduce the information transmission rate is performed (ST 203), when the total sum of the power values of all the received signals at the current period is substantially larger than those at the preceding period before one or more control cycles.

When the value of the power at the current period is substantially larger than that of the preceding period before one or more control cycle, it is meant that the interference with the signals of other stations is large. Thereby, the interference with the signals of other stations may be reduced through reduced transmission power after reduction in the information transmission rate.

Figure 4:
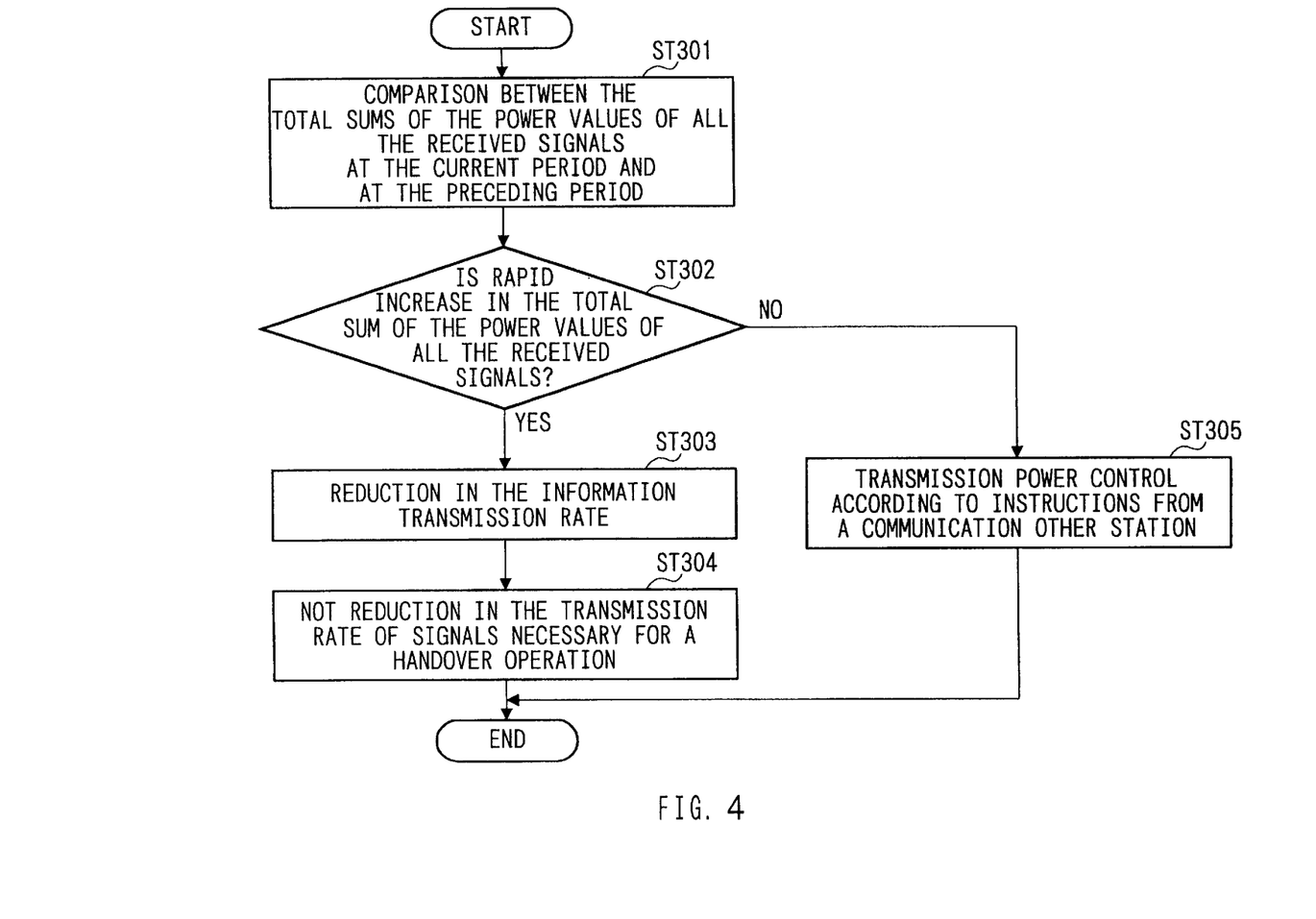
FIG. 4 shows an explanatory flowchart of operations for a transmission power control method according to an embodiment 1 of the present invention.

Now, other operations for over-interference prevention control of the communication terminal according to the embodiment 1 of the present invention will be described, referring to a flowchart in FIG. 4.

In the first place, the power of all the received signals is measured in the communication terminal at ST301, and the measured total sum of the power values of all the received signals and that sum before one or more control cycles of the transmission power are compared at step 301. Then, the comparison results of the total sum of the power values of all the received signals are judged at ST 302. That is, it is judged whether the increased quantity of the above total sum is larger than a predetermined threshold.

TPC is continued according to TPC instruction from the connection end (communication other station) (ST 305), when there is no large change in the total sum of the power values of all the received signals between the current period and the preceding period before one or more control cycles. On the other hand, only the transmission rate of information data is reduced (ST 303), and the transmission rates of control data necessary for a handover operation, and of signals necessary for link maintenance are not reduced (ST 304), when the above total sum at the current period is substantially larger than that sum at the preceding period before one or more control cycles.

Thereby, interference with the signals of other stations may be reduced. Further, as the transmission rate only for information data is reduced, and the rates of control data necessary for a handover operation, and of signals necessary for link maintenance are maintained, the link may be maintained even in a service area under unfavorable visibility.

Embodiment 2

Figure 5:
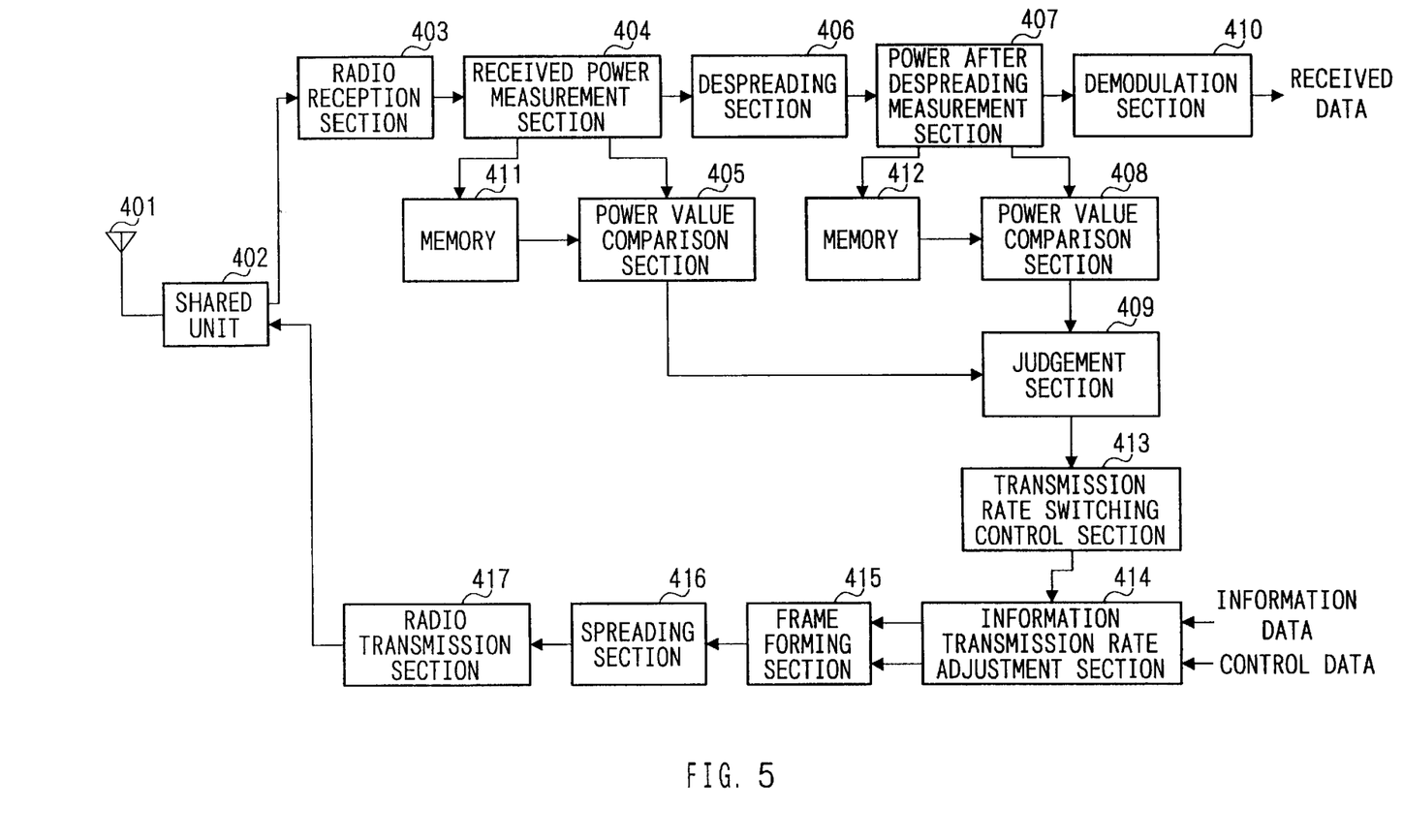
FIG. 5 shows a block diagram of a configuration of a communication terminal according to an embodiment 2 of the present invention.

FIG. 5 shows a block diagram of a configuration of a communication terminal (mobile station) according to an embodiment 2 of the present invention. Now, a communication terminal in a digital radio communication system using the CDMA method will be described.

The signals transmitted from a communication other station are received at a radio reception section 403 through a shared unit 402 after passing through an antenna 401. In the radio reception section 403, individual operations, amplification (gain control), down conversion, and A/D conversion, of the received signals are performed. The signals after the above A/D conversion are sent to a received power measurement section 404 for measurement of the received power. The measured values of the received power are sent to a power value comparison section 405, and stored in a memory 411.

In the power value comparison section 405, the values of the received power sent from the received power measurement section 404, and the values of the received power, which are stored in the memory 411, before one control cycle of the transmission power are compared.

The above comparison results of the values of the received power are sent to a judgment section 409 for threshold judgement. Moreover, the received signals after power measurement are sent to a despreading section 406.

In the despreading section 406, a despreading operation of the received signals after spreading modulation at the transmission side is performed, using the same spreading code as the one used at the transmission side. The signals after despreading are sent to a power after despreading measurement section 407, and the power after despreading is measured.

The measured values of the power after despreading are sent to a power value comparison section 408, and stored in a memory 412. Moreover, the signals after measurement of power after despreading are sent to a demodulation section 410, and obtained as received data after demodulation.

In the power value comparison section 408, the values of the power after despreading sent from the power after despreading measurement section 407, and the values of the power after despreading, which are stored in the memory 412, before one control cycle of the transmission power are compared. The above comparison results of the values of the power after despreading are sent to the judgment section 409 for comparison with the comparison results of the received power sent from the power value comparison section 405. In the judgment section 409, it is judged from the comparison results of the received power and those of the power after despreading whether the increase in the received power is caused by the communication other station or not.

In a transmission rate switching control section 413, switching of transmission rates is controlled, based on judgment results in the judgment section 409. In an information transmission rate adjustment section 414, information transmission rate is adjusted, according to the control of the transmission rate switching control section 413.

Data adjusted in the information transmission rate adjustment section 414 are sent to a frame forming section 415, in which frame forming of transmission signals is performed, using information data and control data.

Signals after frame forming are sent to a spreading section 416 for spreading modulation using a predetermined spreading code, and to a radio transmission section 417, which performs D/A conversion, up conversion, and amplification (gain control) of the signals after spreading modulation. The signals after the above operations are transmitted as transmission signals through the antenna 401, after passing through the shared unit 402.

The operations of the communication terminal with the above configuration will be described. The received signals from the communication other station (base station working as a connection end) are measured for the received power at the received power measurement section 404. The measured received power is properly stored in the memory 411. The values of the received power at reception (values of the received power at the current period) and those of the received power before one control cycle of the transmission power (values of the received power at the preceding period) are compared in the power value comparison section 405. The above values of the received power before one control cycle of the transmission power are output from the memory 411. And the received signals after power measurement are sent to the despreading section 406.

Thereafter, the threshold judgement of the differences in the compared values of the received power is performed at the judgment section 409. The above threshold judgment is performed for checking whether there is a large change in the values of the received power between the preceding and the current period. Then, when the above differences in the values of the received power are larger than a predetermined threshold, it is judged that there is a large change (rapid increase in the power) in the values of the received power between the preceding and the current period, and, when the above differences are smaller than the predetermined threshold, it is judged that there is no large change in the values of the received power between the preceding and the current period. Here, the above threshold is properly set in the system, considering the degree of the interference, and so on.

Thereafter, when it is judged that there is a large change in the values of the received power between the preceding and the current period, it is required to judge whether the large change in the values of the received power is caused by the base station (the base station BS1 in FIG. 1) working as the communication other station or not, as there is considered to be a possibility that the large change is attributed to a change in a state where the mobile station MS1 is moved in the direction in the arrow shown in FIG. 1, that is, where the station MS1 comes into the sight of the base station BS2.

In order to judge whether the large change in the values of the received power is caused by the base station working as the communication other station or not, it is required to check whether the increase in the power after despreading is balanced with the one in the received power. If there is the above balance, it may be judged that the increase in the received power is attributed to the base station working as a connection end (the base station BS1 shown in FIG. 1). Moreover, if there is no balanced increase in the power after despreading with that in the received power, or not increased or reduced power after despreading, it may be judged that the increase in the power is attributed to other base station (a base station BS2 shown in FIG. 1).

Specifically, the signals after power measurement are despread at the despreading section 406, and then sent to the power after despreading measurement section 407 for power after despreading measurement. The measured values of the power after despreading are properly stored in the memory 412. In the power value comparison section 408, comparison between the values of the received power (values of the power after despreading at the current period) at despreading, and those of the power after despreading (values of the power after despreading at the preceding period before one control cycle of the transmission power) is performed.

On the other hand, the power measurement of the signals after despreading is performed, and the above signals are sent to the demodulation section 410, where the above signals are demodulated to become received data.

Moreover, the measured difference in the values of the power after despreading are sent to the judgment section 409, where the difference in the values of the received power from the power value comparison section 405, and the difference in the values of the power after despreading from the power value comparison section 408 are compared to judge where the difference in the values of the power after despreading is balanced with that in the values of the received power. The above judgment results are sent to the transmission rate switching control section 413.

When it is found from the above judgement results that the difference in the values of the power after despreading is not balanced with that in the values of the received power, it may be judged that the rapid increase in the received power is attributed to other base station (the base station BS2 shown in FIG. 1.), not to the base station working as a connection end (the base station BS1 shown in FIG. 1.).

In such a case, the transmission rate switching control section 413 outputs control instruction signals to perform substantial reduction in the transmission rate of the information data to an information rate adjustment section 414.

The information transmission rate adjustment section 414 performs a buffering or discarding operation of the information data, according to the above instruction signals. However, in such a case, the transmission rate of the control data necessary for a handover operation is not changed, as it is required to be switched to a base station (base station BS2 shown in FIG. 1), to which the increase in the received power is attributed, by the handover operation.

Now, the above information data denotes data which a user using the communication terminal desires to send. Moreover, the above control data is data required for the handover operation, and independent of signals, which are required for link maintenance, such as a pilot signal, and a TPC signal. The above signals required for link maintenance are added in the frame forming section 415.

Specifically, in the information transmission rate adjustment section 414, the buffering operation of the information data is performed in the case of, for example, the packet communication where delaying is permitted, and the discarding operation of the information data is done in the case of, for example, the voice communication where delaying is not permitted and instantaneous response is required.

As described above, the transmission rate of information data may be substantially reduced, and, as a result, the transmission power may be reduced. Thereby, interference with the signals of other stations may be reduced.

Figure 6:
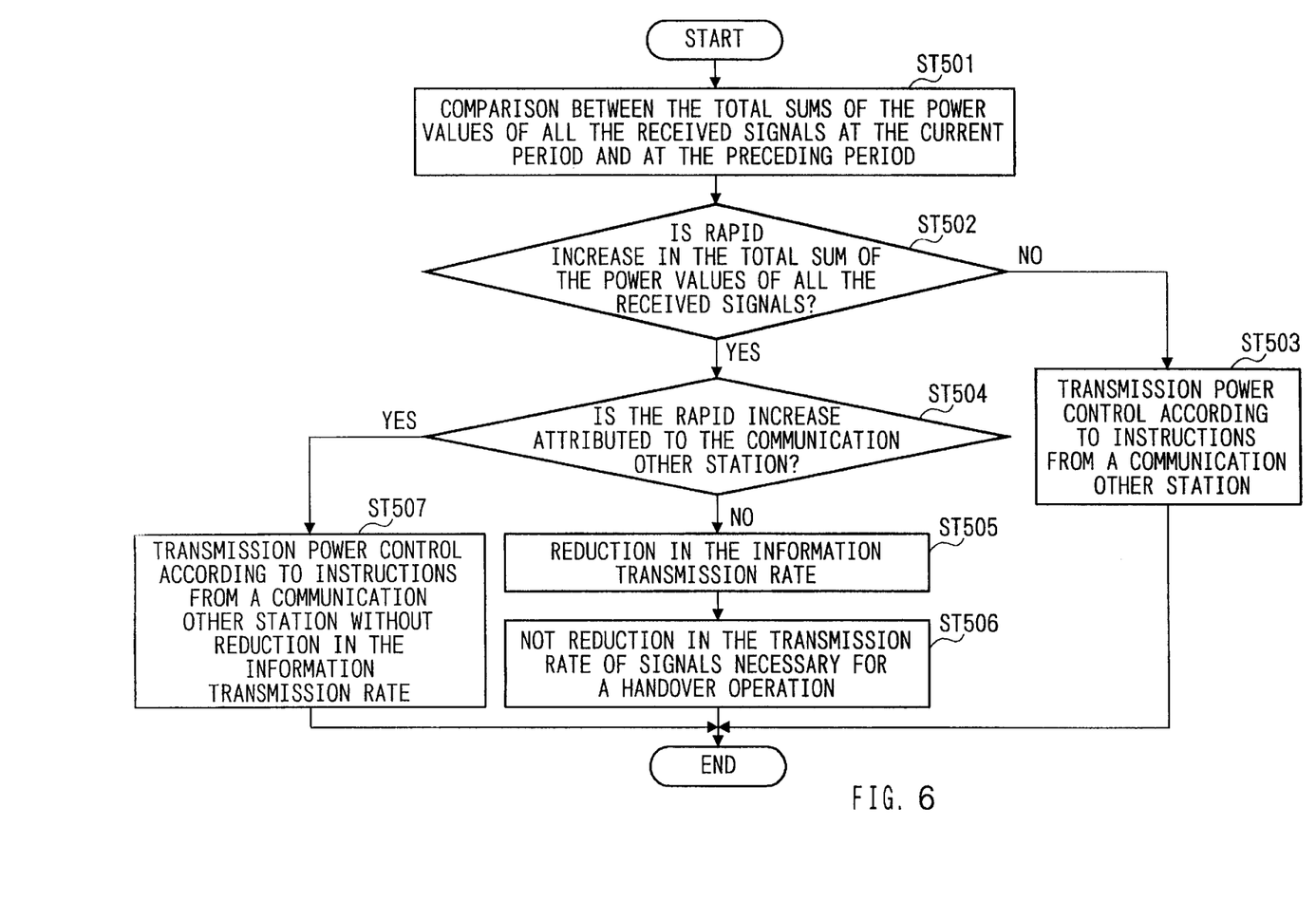
FIG. 6 shows an explanatory flowchart of operations for a transmission power control method according to an embodiment 2 of the present invention.

Now, operations for over-interference prevention control of the communication terminal according to an embodiment of the present invention will be described, referring to a flowchart in FIG. 6.

In the first place, the power of all the received signals is measured in the communication terminal, and the measured total sum of the power values of all the received signals and that sum before one or more control cycles of the transmission power are compared, at ST 501. Then, the comparison results of the above total sums are judged at ST 502. That is, it is judged whether the increased quantity of the total sum of the power values of all the received signals is larger than a predetermined threshold.

TPC is continued according to instructions from the base station working as a connection end (communication other station) (ST 503), when there is no large change in the total sum of the power values of all the received signals between the current period and the preceding period before one or more control cycles. On the other hand, it is judged (ST 504) whether the above increase is attributed to the base station working as a connection end, when the total sum of the power values of all the received signals at the current period are substantially larger than that sum at the preceding period before one or more control cycles. The above judgment is performed by comparison between the increased quantity of the above total sum and that of the power after despreading.

If the increased quantity in the power after despreading is balanced with the one in the total sum of the power values of all the received signals, it may be judged that the received power from the base station working as a connection end is increased, and, if not, it may be judged that the received power from other base station, other than the communication other station, is increased.

When the increase in the total sum of the power values of all the received signals is attributed to the base station working as a connection end, TPC is performed (ST 507) according to instructions from the base station working as a connection end without reduction in the information transmission rate. When the above increase is not attributed to the above base station, only the transmission rate of information data is reduced (ST 505), and the transmission rates of control data necessary for a handover operation, and of signals necessary for link maintenance are not reduced (ST 506).

As described above, the communication terminal according to the present embodiment may perform radio communication without cutting-out of links, and with no increase in interference with signals of other stations even in a service area under unfavorable visibility, as the above terminals may easily judge that there is a base station which comes into sight of the station with the above terminal.

The present invention may not be limited to the above embodiments and various kinds of variations may be possible. For example, any judging method to recognize rapid increase in the received power may be used without any limitations, though the threshold judgment is used for judgement of the above increase in the above embodiments.

The communication terminal of the present invention has a configuration which comprises: a detector to detect the rapid increase in the power values of all the received signals; a controller to reduce the information transmission rate when the power values of all the above received signals increase rapidly.

According to the above configuration, interference with signals of other stations may be reduced.

The communication terminal of the present invention has a configuration where the above controller does not reduce the transmission rates of control signals necessary for a handover operation, and signals required for link maintenance in the case of the rapid increase in the above total sum of the power values of all the received signals.

According to the above configuration, interference with signals of other stations may be reduced without cutting-out of links even in a service area under unfavorable visibility, as only the transmission rate of information data is reduced, and the transmission rates of control data necessary for a handover operation, and of signals necessary for link maintenance are maintained.

The communication terminal of the present invention has a configuration, wherein it comprises a judging device to judge whether the rapid increase in the total sum of the power values of all the received signals is attributed to the communication other station in the case of rapid increase in the above sum; and, by control of the above controller, the transmission rates of control data necessary for a handover operation, and of signals necessary for link maintenance are not reduced, and the information transmission rate is reduced, when the above rapid increase is not attributed to the communication other station.

According to the above configuration, radio communication with a proper communication other station may be realized. Thereby, there may be no need to increase the transmission power for the communication, and interference with signals of other stations may be reduced.

The communication terminal of the present invention has a configuration, wherein the information transmission rate is not reduced, and TPC is performed according to instructions from the base station working as a connection end, when the above rapid increase in the above total sum of the power values of all the received signals is attributed to the communication other station. According to the above configuration, interference with signals of other stations may be reduced.

The communication terminal of the present invention has a configuration, wherein the information transmission rate is reduced when it is possible to do so, and the information transmission is stopped, when it is not possible to reduce the above rate, under communication where there is rapid increase in the above total sum of the power values of all the received signals, and instantaneous response is required. According to the above configuration, interference with signals of other station may be reduced.

The communication terminal of the present invention has a configuration, wherein the transmission of control data necessary for a handover operation, and that of signals necessary for link maintenance are not stopped in the case of the above rapid increase in the total sum of the power values of all the received signals.

According to the above configuration, interference with signals of other stations may be reduced without cutting-out of links even in a service area under unfavorable visibility, as only the transmission rate of information data is reduced, or the transmission of the above data is stopped, and the transmission rates of control data necessary for a handover operation, and of signals necessary for link maintenance are maintained.

The communication terminal of the present invention has a configuration, wherein it comprises a judging device to judge whether the rapid increase in the total sum of the power values of all the received signals is attributed to the communication other station in the case of rapid increase in the above total sum; and, by control of the above controller, the information transmission rate is reduced when it is possible to do so, and the information transmission is stopped, when it is not possible to reduce the information transmission rate, under communication, requiring instantaneous response, where the rapid increase in the above total sum is not attributed to the communication other station, and the transmission rates of control data necessary for a handover operation, and of signals necessary for link maintenance are not reduced or the transmission of the above control data and the above signals is not stopped.

According to the above configuration, radio communication with a proper communication other station may be realized. Therefore, there is no need to increase the transmission power to cause reduction in the interference with signals of other stations.

The communication terminal of the present invention has a configuration wherein TPC is performed according to instructions from the base station working as a connection end without reducing the information transmission rate or stopping the information transmission, when the rapid increase in the above total sum of the power values of all the received signals is attributed to the communication other station. According to the above configuration, interference with other stations may be reduced.

Devices of a base station according to the present invention perform radio communication with the above communication terminal. According to the above configuration, radio communication may be performed, under reduced interference with signals of other stations.

An over-interference prevention method according to the present invention comprises a detection process to detect increase in the total sum of the power values of all the received signals, and a control process to reduce an information transmission rate in the case of rapid increase in the above total sum. According to the above method, interference with signals of other stations may be reduced.

In an over-interference prevention method according to the present invention, transmission rates of control signals necessary for a handover operation and of signals required for link maintenance are controlled not to be reduced in the case of rapid increase in the above total sum of the power values of all the received signals.

According to the above method, the above configuration, links may not be cut off even in a service area under unfavorable visibility, as only the transmission rate of information data is reduced, and the above rates of control data necessary for a handover operation, and of signals necessary for link maintenance are maintained.

An over-interference prevention method comprises a judging process to judge in the case of the rapid increase in the above total sum of the power values of all the received signals whether the rapid increase in the above total sum is attributed to the communication other station, wherein transmission rates of control signals necessary for a handover operation and signals required for link maintenance are controlled not to be reduced, and the information transmission rate is done to be reduced, when the above rapid increase is attributed not to the communication other station, in the above control process.

According to the present method, there is no cutting-out of links even in a service area under unfavorable visibility, as only transmission rate of information data is reduced, and the transmission rates of control data necessary for a handover operation, and of signals required for link maintenance are maintained. Moreover, radio communication with a proper communication other station may be performed. Thereby, there is no need to increase the transmission power and the interference with signals of other stations may be reduced.

In an over-interference prevention method, TPC is performed according to instructions from the base station working as a connection end without reduction in the information transmission rate, when the rapid increase in the above total sum of the power values of all the received signals is attributed to the communication other station. According to the above method, interference with signals of other stations may be reduced.

In an over-interference prevention method, the information transmission rate is reduced when it is possible to do so, and the information transmission is stopped, when it is not possible to reduce the above rate, under communication where there is rapid increase in the above total sum of the power values of all the received signals, and instantaneous response is required. According to the above method, interference with signals of other station may be reduced.

In an over-interference prevention method, the transmission rates of control signals necessary for a handover operation and of signals required for link maintenance are controlled not to be reduced, or the transmission of the above signals is done not to be stopped during the above control process, under communication requiring instantaneous response in the case of rapid increase in the above total sum of the power values of all the received signals.

According to the above method, there is no cutting-out of links even in a service area under unfavorable visibility, as only transmission rate of information data is reduced, and the transmission rates of control data necessary for a handover operation, and of signals required for link maintenance are maintained.

An over-interference prevention method comprises a judging process to judge in the case of the rapid increase in the above total sum of the power values of all the received signals whether the rapid increase in the above total sum is attributed to the communication other station, wherein the information transmission rate is reduced when it is possible to do so, and the information transmission is stopped, when it is not possible to reduce the information transmission rate, under communication, requiring instantaneous response, where the rapid increase in the above total sum is not attributed to the communication other station, and the transmission rates of control data necessary for a handover operation, and of signals necessary for link maintenance are not reduced or the transmission of the above control data and the above signals is not stopped, in the above control process.

According to the present method, there is no cutting-out of links even in a service area under unfavorable visibility, as only transmission rate of information data is reduced, or the transmission of the above information data is stooped, and the transmission rates of control data necessary for a handover operation, and of signals required for link maintenance are maintained. Moreover, radio communication with a proper communication other station may be performed.

Thereby, there is no need to increase the transmission power and the interference with signals of other stations may be reduced.

In an over-interference prevention method, TPC is performed according to instructions from the base station working as a connection end without reduction in the information transmission rate, or stopping of the information transmission, when the rapid increase in the above total sum of the power values of all the received signals is attributed to the communication other station. According to the above method, interference with signals of other stations may be reduced.

As described above, according to the communication terminal and the transmission power control method of the present invention, the transmission rates of control data for a handover operation, and of signals required for link maintenance are kept as the same rate as the one before the rapid increase, and the transmission rate of the information data is rapidly reduced, in the case of the rapid increase in the received power at the terminal side.

During the above, the handover operation is performed by control data, if there is a need for the above operation, and the transmission signal power is reduced if not. Thereby, radio communication may be performed without cutting-out of links, and with no increase in interference with signals of other stations even in a service area under unfavorable visibility, The present application is based on Japanese published unexamined patent application Hei 11-156630 filed on Jun. 3, 1999, and Japanese published unexamined patent application Hei 11-191602 filed on Jul., 6, 1999. And all the contents of the above applications are incorporated herein.

Industrial Applicability The present invention may be applied to communication terminals, and devices of base stations in digital radio communication systems.

What is claimed is:

1. A communication terminal comprising:
    a detection means for detection of rapid increase in a total sum of power values of all the received signals; and
    a control means for reduction in an information transmission rate in the case of rapid increase in said total sum.

2. A communication terminal according to claim 1, wherein transmission rates of control signals necessary for a handover operation and of signals required for link maintenance are controlled not to be reduced by said control means in the case of rapid increase in said total sum of the power values of all the received signals.

3. A communication terminal according to claim 1 further comprising:
    a judging means for judging in the case of the rapid increase in said total sum of the power values of all the received signals whether said increase is attributed to a communication other station, wherein
        transmission rates of control signals necessary for a handover operation and signals required for link maintenance are controlled not to be reduced, and said information transmission rate is done to be reduced, when said increase is attributed not to said communication other station, by said control means.

4. A communication terminal according to claim 3, wherein transmission power control is performed according to instructions from a communication anthor station without reducing the information transmission rate, when said increase is attributed to said communication other station.

5. A communication terminal according to claim 1, wherein said information transmission rate is reduced when it is possible to do so, and information transmission is stopped, when it is not possible to reduce said rate, under communication where there is rapid increase in said total sum of the power values of all the received signals, and instantaneous response is required.

6. A communication terminal according to claim 5, wherein transmission rates of control signals necessary for a handover operation, and of signals necessary for link maintenance are not reduced, or transmission of said control signals and said signals is not stopped, in the case of said rapid increase.

7. A communication terminal according to claim 5, further comprising:
    a judging means for judging in the case of said rapid increase whether said increase is attributed to a communication other station, wherein
        said information transmission rate is controlled to be reduced when it is possible to do so, and said information transmission is controlled to be stopped, when it is not possible to reduce said information transmission rate, by said control means, under communication, requiring instantaneous response, where said increase is not attributed to said communication other station, and transmission rates of control signals necessary for a handover operation, and of signals necessary for link maintenance are not reduced, or transmission of said control signals and said signals is not stopped.

8. A communication terminal according to claim 7, wherein transmission power control is performed according to instructions from a communication other station without reducing said information transmission rate, or stopping said information transmission, when said increase is attributed to said communication other station.

9. Devices of a base station for radio communication with a communication terminal, said communication terminal comprising:
    a detection means for detection of rapid increase in a total sum of power values of all the received signals; and
    a control means for reduction in an information transmission rate in the case of said increase.

10. An over-interference prevention method, comprising:
    a detection process to detect increase in the total sum of the power values of all the received signals, and
    a control process to reduce an information transmission rate in the case of rapid increase in said total sum.

11. An over-interference prevention method according to claim 10, wherein
    transmission rates of control signals necessary for a handover operation and of signals required for link maintenance are controlled not to be reduced, in said control process.

12. An over-interference prevention method according to claim 10, comprising:
    a judging process to judge in the case of said increase whether said increase is attributed to a communication other station, wherein
        transmission rates of control signals necessary for a handover operation and signals required for link maintenance are controlled not to be reduced, and said information transmission rate is done to be reduced, when said increase is attributed not to said communication other station, in said control process.

13. An over-interference prevention method according to claim 12, wherein
    transmission power control is performed according to instructions from a communication other station without reduction in said information transmission rate, when said increase is attributed to said communication other station.

14. An over-interference prevention method according to claim 10, wherein
    said information transmission rate is reduced when it is possible to do so, and
    information transmission is stopped, when it is not possible to reduce said information transmission rate, under communication requiring instantaneous response in the case of said increase.

15. A transmission power control method according to claim 14, wherein transmission rates of control signals necessary for a handover operation and of signals required for link maintenance are controlled not to be reduced, or transmission of said signals is done not to be stopped in said control process, under communication requiring instantaneous response in the case of said increase.

16. An over-interference prevention method according to claim 14, further comprising:
    a judging process for judging in the case of said increase whether said increase is attributed to a communication other station; wherein said information transmission rate is controlled to be reduced when it is possible to do so, and said information transmission is controlled to be stopped, when it is not possible to reduce said information transmission rate, in said control process, under communication, requiring instantaneous response, where said increase is not attributed to said communication other station, and transmission rates of control signals necessary for a handover operation, and of signals necessary for link maintenance are not reduced, or transmission of said control signals and said signals is not stopped.

17. An over-interference prevention method according to claim 16, wherein transmission power control is performed according to instructions from a communication without reducing said information transmission rate, or stopping said information transmission, when said increase is attributed to said communication other station.

* * * * *